US008249928B2

(12) United States Patent
Schuller et al.

(10) Patent No.: US 8,249,928 B2
(45) Date of Patent: Aug. 21, 2012

(54) FOOD PRODUCT SCALE AND METHOD FOR PROVIDING IN-STORE INCENTIVES TO CUSTOMERS

(75) Inventors: Robert J. Schuller, Troy, OH (US); Robert J. Weisz, Aurora (CA); Nigel G. Mills, Kettering, OH (US)

(73) Assignee: Valassis In-Store Solutions, Inc., Livonia, MI (US)

( * ) Notice: Subject to any disclaimer, the term of this patent is extended or adjusted under 35 U.S.C. 154(b) by 3525 days.

(21) Appl. No.: 10/423,471

(22) Filed: Apr. 25, 2003

(65) Prior Publication Data

US 2004/0211600 A1      Oct. 28, 2004

Related U.S. Application Data

(60) Provisional application No. 60/376,184, filed on Apr. 29, 2002.

(51) Int. Cl.
*G06Q 30/00*      (2012.01)
(52) U.S. Cl. .................................. 705/14.38
(58) Field of Classification Search ...................... 705/14
See application file for complete search history.

(56) References Cited

U.S. PATENT DOCUMENTS

| | | | |
|---|---|---|---|
| 1,681,769 A * | 8/1928 | Heston | 40/638 |
| 2,420,045 A * | 5/1947 | Krug | 40/306 |
| 3,711,683 A | 1/1973 | Hamisch, Sr. | |
| 3,757,037 A | 9/1973 | Bialek | |
| 3,994,089 A | 11/1976 | Schwartz | |
| 4,323,608 A | 4/1982 | Denny et al. | |
| 4,423,486 A | 12/1983 | Berner | |
| 4,457,539 A * | 7/1984 | Hamisch, Jr. | 283/87 |
| 4,598,780 A * | 7/1986 | Iwasaki et al. | 177/3 |
| 4,674,041 A | 6/1987 | Lemon et al. | |
| 4,723,212 A * | 2/1988 | Mindrum et al. | 705/14 |
| 4,821,186 A * | 4/1989 | Munakata et al. | 705/14 |
| 4,901,237 A * | 2/1990 | Hikita et al. | 705/414 |
| 4,901,457 A | 2/1990 | Chandler | |
| 4,910,672 A | 3/1990 | Off et al. | |
| 4,928,229 A | 5/1990 | Teraoka et al. | |
| 4,929,818 A | 5/1990 | Bradbury et al. | |
| 4,932,485 A | 6/1990 | Mori | |

(Continued)

FOREIGN PATENT DOCUMENTS

EP      0568088      11/1993

(Continued)

OTHER PUBLICATIONS

Ishida, *AC-3000 Series* brochure, 6 pages, published at least as early as Nov. 26, 1996.

(Continued)

*Primary Examiner* — Eric W Stamber
*Assistant Examiner* — Stacie D. Gatling
(74) *Attorney, Agent, or Firm* — Brooks Kushman P.C.

(57) ABSTRACT

In addition to standard product labels, incentive labels are printed and provided to customers when an item is identified to and weighed by a scale/label printer located in a store by accessing an incentive database to determine the existence and nature of any incentive. One or more display devices may be used in connection with providing incentives, including enabling a customer to select from among a number of incentives displayed. An incentive label construction may be provided with desirable folding features. Certain incentives may be of a graduated/progressive type to invite larger purchases by customers.

28 Claims, 8 Drawing Sheets

U.S. PATENT DOCUMENTS

| | | | |
|---|---|---|---|
| 5,019,436 A * | 5/1991 | Schramer et al. | 428/41.9 |
| 5,083,638 A | 1/1992 | Schneider | |
| 5,172,936 A | 12/1992 | Sullivan et al. | |
| 5,173,851 A | 12/1992 | Off et al. | |
| 5,185,695 A * | 2/1993 | Pruchnicki | 705/14 |
| 5,200,889 A | 4/1993 | Mori | |
| 5,329,713 A | 7/1994 | Lundell | |
| 5,350,612 A | 9/1994 | Stern et al. | |
| RE34,915 E * | 4/1995 | Nichtberger et al. | 705/14 |
| 5,439,721 A | 8/1995 | Pedroli et al. | |
| 5,560,718 A * | 10/1996 | Furuya | 400/68 |
| 5,578,797 A * | 11/1996 | Hewitt et al. | 177/5 |
| 5,612,868 A | 3/1997 | Off et al. | |
| 5,642,485 A | 6/1997 | Deaton et al. | |
| 5,649,114 A | 7/1997 | Deaton et al. | |
| 5,758,328 A | 5/1998 | Giovannoli | |
| 5,774,868 A | 6/1998 | Cragun et al. | |
| 5,832,457 A | 11/1998 | O'Brien et al. | |
| 5,857,175 A | 1/1999 | Day et al. | |
| 5,865,470 A | 2/1999 | Thompson | |
| 5,866,181 A | 2/1999 | Hill | |
| 5,887,271 A | 3/1999 | Powell | |
| 5,892,827 A | 4/1999 | Beach et al. | |
| 5,895,075 A | 4/1999 | Edwards | |
| 5,926,795 A | 7/1999 | Williams | |
| 5,943,654 A | 8/1999 | Goodwin, III et al. | |
| 5,956,877 A | 9/1999 | Raasch et al. | |
| 5,974,396 A | 10/1999 | Anderson et al. | |
| 5,974,399 A | 10/1999 | Giuliani et al. | |
| 6,009,411 A | 12/1999 | Kepecs | |
| 6,014,634 A | 1/2000 | Scroggie et al. | |
| 6,026,370 A | 2/2000 | Jermyn | |
| 6,026,373 A | 2/2000 | Goodwin III | |
| 6,041,309 A | 3/2000 | Laor | |
| 6,042,149 A | 3/2000 | Roshkoff | |
| 6,047,263 A | 4/2000 | Goodwin, III | |
| 6,055,573 A | 4/2000 | Gardenswartz et al. | |
| 6,067,524 A | 5/2000 | Byerly et al. | |
| 6,076,069 A | 6/2000 | Laor | |
| 6,138,911 A | 10/2000 | Fredregill et al. | |
| 6,151,586 A | 11/2000 | Brown | |
| 6,151,587 A | 11/2000 | Matthias | |
| 6,240,394 B1 | 5/2001 | Uecker et al. | |
| 6,278,979 B1 | 8/2001 | Williams | |
| 6,282,516 B1 * | 8/2001 | Giuliani | 705/14 |
| 6,304,849 B1 | 10/2001 | Uecker et al. | |
| 6,307,958 B1 | 10/2001 | Deaton et al. | |
| 6,321,210 B1 | 11/2001 | O'Brien et al. | |
| 6,334,108 B1 | 12/2001 | Deaton et al. | |
| 6,351,735 B1 | 2/2002 | Deaton et al. | |
| 2003/0037965 A1 * | 2/2003 | Bennard | 177/4 |
| 2003/0205412 A1 | 11/2003 | Hewitt et al. | |

FOREIGN PATENT DOCUMENTS

| | | |
|---|---|---|
| EP | 0837411 A1 | 4/1998 |
| EP | 0853290 A2 | 7/1998 |
| EP | 1197892 | 4/2002 |
| EP | 1197892 A1 | 4/2002 |
| FR | 2741987 | 6/1997 |
| JP | 60193824 | 10/1985 |
| JP | 63144667 | 6/1988 |
| JP | 63178875 | 7/1988 |
| JP | 63191370 | 8/1988 |
| JP | 3138171 | 6/1991 |

OTHER PUBLICATIONS

Hobart Food Equipment, "CLA Compact Label Applier", for Trayed Self-Service Meat, Poultry, Fish and Produce, 2 pages, May 1993.

Hobart Food Equipment, "HiLite Label Printer & Applier", for Printing and Applying Merchandising Labels, 2 pages, May 1988.

Hobart Food Equipment, "Ultima 2000 PLU Prepack Weighing System", The Hobart Ultima 2000 PLU Prepack Weighing System Provides Merchandising Flexibility, Nutritional and Text Printing and Is Very Simple to Use, 6 pages, Mar. 1993.

Hobart, "Ultima 2000", The ultimate pre-pack scale/printer merchandising system, 6 pages, Dec. 1992.

Hobart, "Weigh/Wrap/Label Systems", 16 pages, Aug. 1999.

* cited by examiner

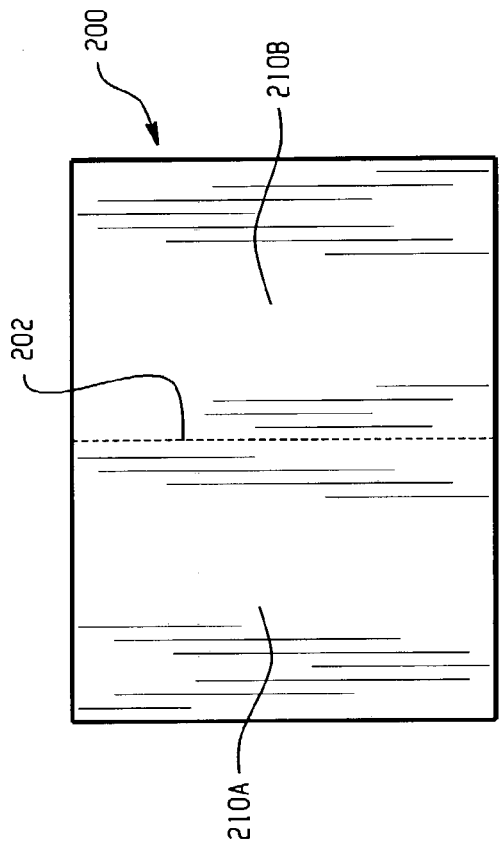
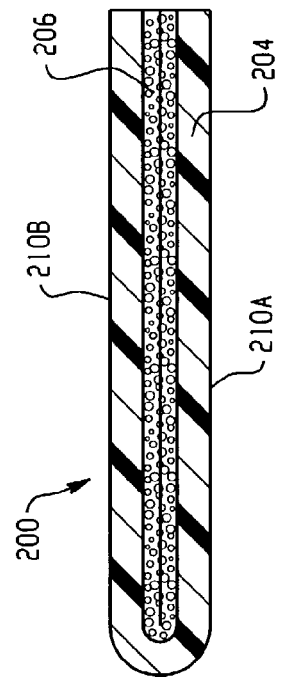
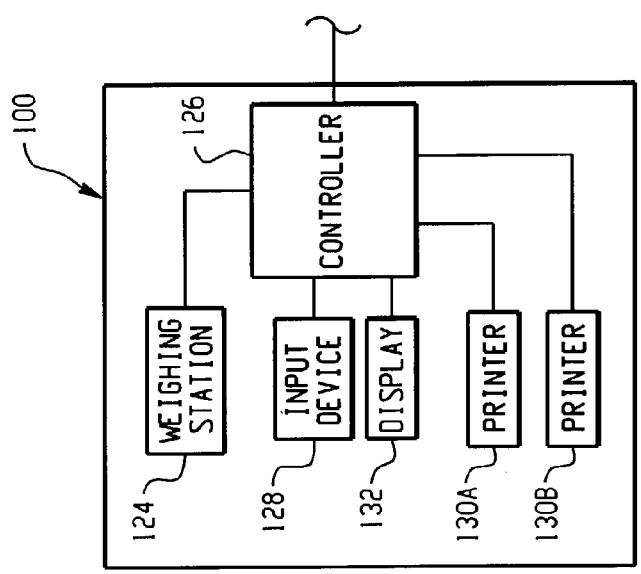

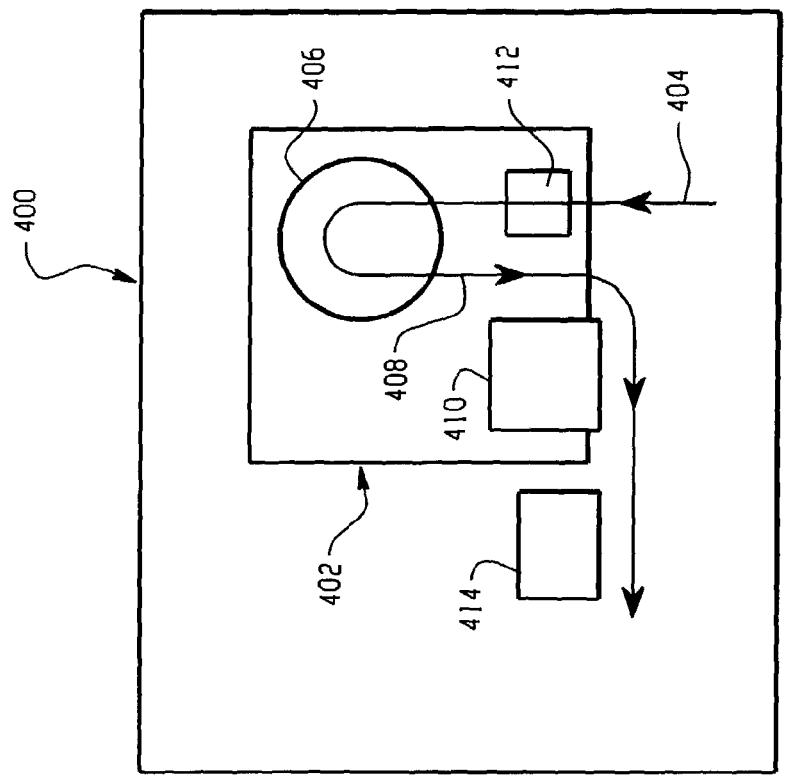
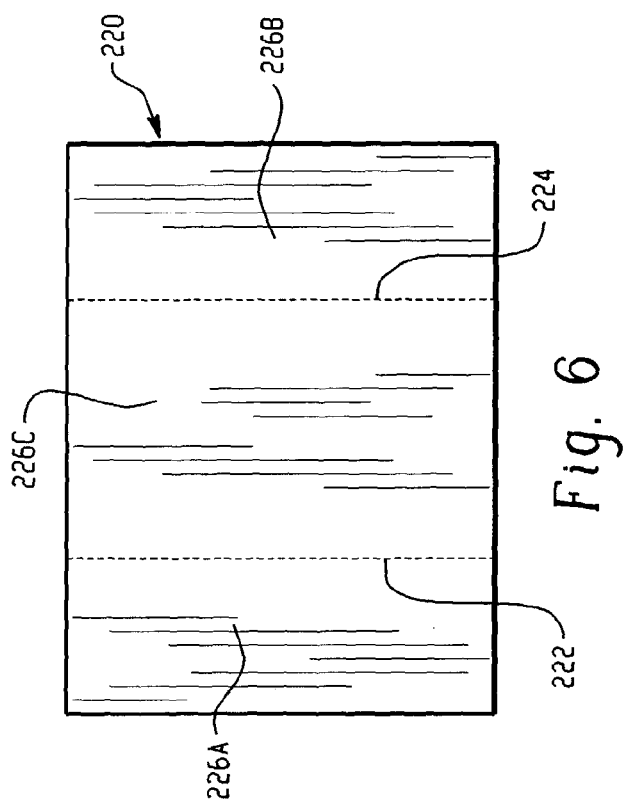
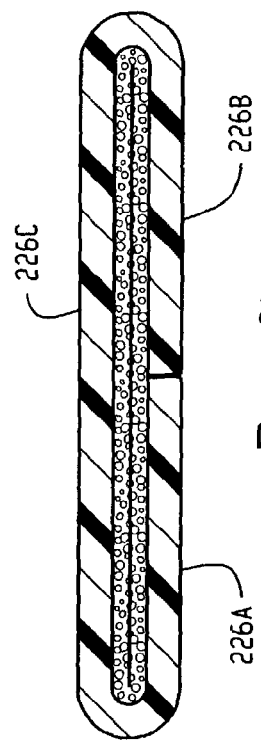

US 8,249,928 B2

FOOD PRODUCT SCALE AND METHOD FOR PROVIDING IN-STORE INCENTIVES TO CUSTOMERS

CROSS-REFERENCE

This application claims the benefit of U.S. provisional application Ser. No. 60/376,184, filed Apr. 29, 2002, the entirety of which is incorporated herein by reference.

TECHNICAL FIELD

The present invention relates generally to in-store scales utilized for weighing food products and printing labels applied to weighed products and to label structures utilized by such printer mechanisms, and more particularly, to a method and system for providing product incentives by an in-store scale for increasing marketing and promotional opportunities.

BACKGROUND

The perishable foods sections of most supermarkets and grocery stores such as the meat department, bakery, deli and produce department, typically include one or more in-store scales having printers for printing labels with item name, weight or count, and price information. The labels are then applied to the packaged items. Many such printers are provided as part of in-store scales or systems including scales.

Increasingly, in-store equipment such as scales/scale systems may include a communications link for receiving information from sites external to the store. As used herein the term scale system refers to any scale device or any larger device that includes a scale, such as a weigh/wrap machine. For example, prior art scale systems exist in which pricing information in the goods database is updated remotely from a central location so that all related stores in a chain use the same pricing scheme. Chain personnel can also use communications links with in-store scale systems to monitor scale status/function. Still further, prior art in-store scale systems exist that are capable of printing two labels, one which includes the product and price information for a given product and another that prints a marketing message for that same product or prints a generic marketing message. An example of such a prior art system is illustrated in FIG. 16 where a store 300 is shown and external site 302 is shown. A scale system 304 including a controller 306 and associated printer 308 is located in the store 302, along with a second printer 310 that is connected to controller 306 for control thereby. The controller 306 is also connected via communications link 312 to a computer 314 at external site 302. In the illustrated system, computer 314 has been used to control pricing information used by scale 304 for printing on a first label by printer 308, and to also control merchandising messages printed on a second, separate label by printer 310, where the pricing information printed by printer 308 and the merchandising information printed by printer 310 related to the same product. Examples of merchandising messages printed on the second label by printer 310 include "Great For The Grill" or "100% Pure Ground Beef" or "50¢ Off". Such prior art systems have also been used to print similar merchandising messages, regarding the product to which a pricing label is applied, on the pricing label itself. This system did not provide for any cross-marketing type incentives.

It is known to provide coupon dispensing printers at the point of sale in supermarkets and groceries. Typically such coupon dispensers print coupon or other incentive information on paper stock based upon purchases made or not made by the consumer. For example, the items scanned at the point of sale are tracked and a database of incentives to be provided based upon the purchase of a certain product, combination of products, or an amount of a certain product or combination of products may be used to generate incentives for printing at the point of sale. Likewise, the database may generate incentives based upon the failure of the consumer to purchase a certain product or combination of products, or an incentive may be generated based upon identifying the customer and referring to a prior shopping history. While such systems have proven somewhat effective, they still suffer the drawback of not placing the incentive into the possession of a consumer until the consumer is on the way out the door.

Product manufacturers, distributors, advertisers and store operators are continually looking for new and improved ways to market and advertise products within the store. Accordingly, given the number of labels printed on a daily basis by such scales, and the fact that the packages containing such labels are typically placed directly in front of consumers or into the consumer's hands, it would be desirable to utilize such scales to deliver marketing and promotional messages for numerous products in a controlled manner.

SUMMARY

In one aspect, a scale for weighing products includes a weighing device for producing weight indicative signals, a controller for receiving weight indicative signals from the weighing device, at least one label printing mechanism connected to receive print control signals from the controller, and an input device, with the controller connected to receive signals from the input device. The controller has at least one operating mode during which the controller will operate to: based in part upon a first item identifier for a first item and a received weight indicative signal for the first item, calculate a price for the first item and effect printing of a product label, including printing on the product label the price of the item and a scannable bar code; access an incentive database based upon the first item identifier to determine if an incentive link exists for the first item; if an incentive link exists for the first item, effect printing of an incentive label containing an incentive for a second item that is different than the first item, where the incentive label is separate from the product label.

In another aspect, a scale for weighing products includes a weighing device for producing weight indicative signals, a controller connected for receiving weight indicative signals from the weighing device, at least one label printing mechanism connected to print labels under control of the controller, an input device, with the controller connected to receive signals from the input device, and a display screen connected to display information under control of the controller. The controller has at least one operating mode during which the controller will operate to: based in part upon a first item identifier for a first item and a received weight indicative signal for the first item, calculate a price for the first item; access an incentive database based upon the first item identifier to determine if multiple incentives are associated with the first item and, if so, effect display of multiple incentive indications on the display screen, the multiple incentives relating to one or more items that are different than the first item; and responsive to input of a selected incentive from among those displayed, effect printing of the selected incentive on a label.

In a further aspect, a scale for weighing products includes a weighing device for producing weight indicative signals, a controller connected for receiving weight indicative signals from the weighing device, at least one label printing mechanism connected to print labels under control of the controller, an input device, with the controller connected to receive signals from the input device, and a display screen connected to display information under control of the controller. The controller has at least one operating mode during which the controller will operate to: based in part upon a first item identifier for a first item and a received weight indicative signal for the first item, calculate a price for the first item; determine if a second item progressive incentive is associated with the first item and, if so, effect display of progressive incentive information for the second item on the display screen for inviting a customer to purchase more of the first item in order to obtain a more economically advantageous incentive for the second item.

In yet another aspect, a scale for weighing products includes a weighing device for producing weight indicative signals, a controller connected for receiving weight indicative signals from the weighing device, at least one label printing mechanism connected to print labels under control of the controller, an input device for inputting item identifiers, with the controller connected to receive signals from the input device, and a display screen connected to display information under control of the controller. The controller has at least one operating mode during which the controller will operate to: based in part upon an input first item identifier for a first item and a received weight indicative signal for the first item, calculate a price for the first item; determine if multiple incentives are associated with the first item and, if so, effect printing of a first incentive for a second item on one label and printing of a second incentive for a third item on another label to facilitate providing two incentive labels to a customer based upon the customer's interest in the first item.

In still a further aspect, a method of modifying an existing scale to facilitate production of incentive labels is provided, where the scale located in a perishable food department of a store for printing product labels based upon weighing of items. The method involves the steps of: loading a program segment or segments into memory of the scale, where the loaded segment or segments will effect the following steps when an item identifier is provided to the scale for a first item, the first item is the weighed by the scale and a product label is produced for the first item: accessing an incentive database based upon the item identifier to determine if an incentive link exists for the first item; and if an incentive link exists for the first item, printing an incentive label containing an incentive for a second item that is different than the first item.

In another aspect, in a store including a plurality of point of sale terminals and one or more perishable food departments, at least one perishable food department having a scale installed therein for weighing items and printing product labels for the items, a method of providing an incentive label to a customer involves the steps of: providing to the scale an identifier of a first item; weighing the first item; based upon a weight of the first item, the scale calculating a price for the first item and printing a product label including the price of the item and a scannable bar code; determining if an incentive link exists for the scale; if an incentive link exists, printing an incentive label containing an incentive for a second item that is different than the first item; and wherein a product display unit is positioned proximate to the scale and holds and displays the second item.

In a further aspect, in a store including a plurality of point of sale terminals and one or more perishable food departments, at least one perishable food department having a label printer installed therein for printing product labels based for items, a method of providing an incentive label to a customer involves the steps of: providing to the label printer an identifier of a first item; based upon at least the identifier for the first item, establishing a price for the first item; accessing an incentive database based upon the first item identifier to determine if an incentive link exists for the first item; if an incentive link exists for the first item, the label printer printing an incentive label containing an incentive for a second item that is different than the first item; wherein the incentive label includes at one fold line therein to divide the label into at least first and second parts, in the printing step a coupon bar code is printed on a label print side of the first part and incentive identification indicia is printed on a label print side of the second part, the coupon is folded along the fold line such that the first part is located beneath the second part and is adhesively held thereto.

In yet another aspect, a labeled package assembly includes a package containing a first product and a label attached to the package. The label includes a separation line dividing the label into first and second parts, the second part including a fold line dividing the second part into first and second sub-parts. The first and second sub-parts are substantially the same size and the first sub-part is folded under the second-subpart and adhesively attached thereto. The first sub-part includes a scannable coupon bar code thereon that relates to a second product that is different than the first product, the scannable coupon bar code facing inwardly toward the package. The second sub-part is adjacent the separation line and includes indicia specifying incentive information for the second product. The first part is adhesively attaches the label to the package such that the first part is fixed to the package while enabling the second part to be removed from the package by tearing along the separation line.

BRIEF DESCRIPTION OF THE DRAWINGS

FIG. 3 is a schematic diagram of an alternative scale in accordance with one or more embodiments of the present application;

FIG. 4 is an exemplary label construction in accordance with one or more embodiments of the present application;

FIG. 5 is an alternate view of the label construction depicted in FIG. 4;

FIG. 6 is another exemplary label construction in accordance with one or more embodiments of the present application;

FIG. 7 is an alternate view of the label construction depicted in FIG. 6;

FIG. 8 is a scale system in accordance with one or more embodiments of the present application;

DESCRIPTION

Figure 1:
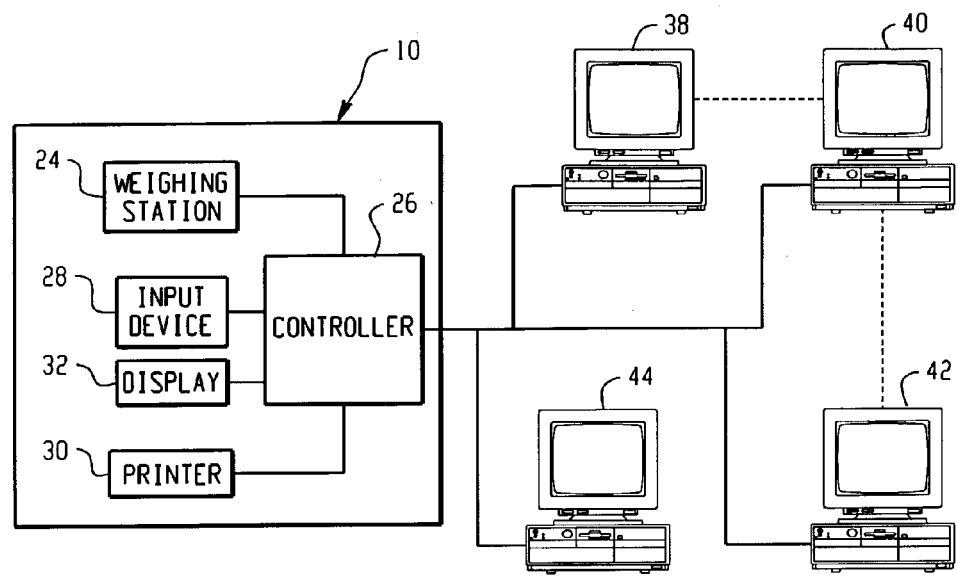
FIG. 1 is a schematic diagram of a system including an exemplary scale in accordance with one or more embodiments of the present application.
Figure 2:
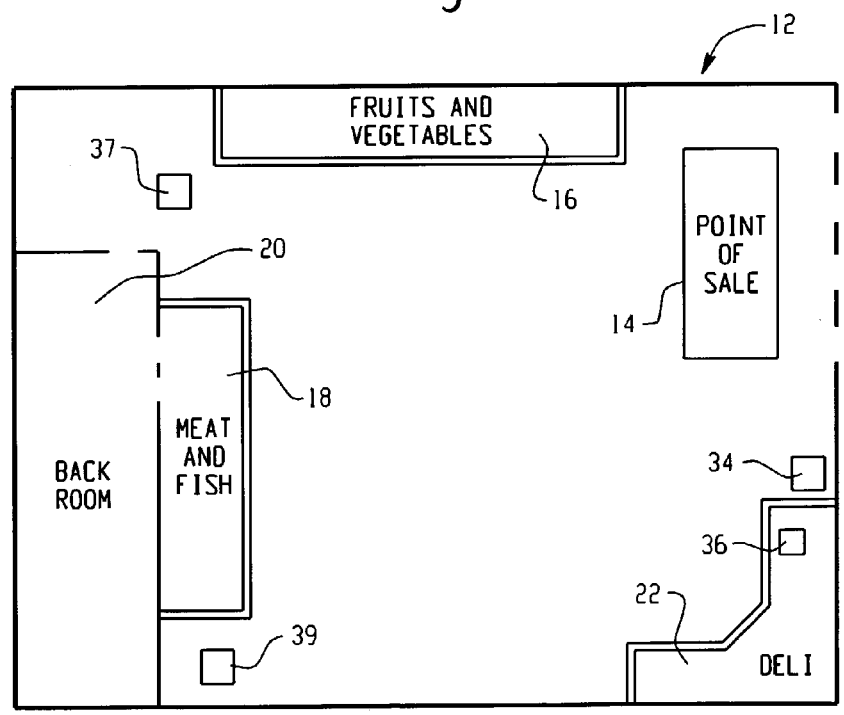
FIG. 2 is a schematic diagram of a store incorporating the system in accordance with one or more embodiments of the present application.

In one embodiment, a food product scale 10 (FIG. 1) is used to provide incentives at desired locations within the store 12 (FIG. 2). The store 12 may typically include a point of sale 14 with associated check out scanning terminals. The scale 10 is preferably located at another location, such as a perishables department as represented by the fruit and vegetable department 16, the meat and fish department 18 or associated back room 20, or the deli department 22 so that incentives can be provided to customers prior to the actual purchase of any products and prior to the customer being on the way out of the store.

Referring again to FIG. 1, the scale 10 includes an associated weighing station 24 having a load cell or other known weighing mechanism or device to produce weight indicative signals that are passed to a processor-based controller 26. A user input device 28 (such as a keypad, a touch sensitive display, a scanner, etc) is also connected to the controller 26. The user input device 28 may be utilized by store personnel (or in the case of a self service situation the customer) to identify the product being weighed, usually by a PLU (price look-up) number. Item identifiers for products being weighed may take other forms as well. For example, the input device could comprise a large number of keys, one for each product that might be weighed. The controller 26 refers to a price database (stored in suitable memory of the controller or accessible via a link to another computer system such as a P.O.S. system or a regional or national computer system of a store chain) to identify the price per unit weight linked to the entered PLU or other product identifier, and calculates a total price for the product based upon the weight as indicated by the weight indicative signals received from the weighing station 24. The controller 26 then establishes product print data (such as total price, price per unit weight, product bar code, logos or other image data, label set-up and format) to be delivered to a printing mechanism 30. The printing mechanism 30 includes a print head and associated supply of adhesive labels to be applied to products once the product print data is printed on a label ("product label") and the product label is output. The print head may be a thermal print head, with the labels including a thermally activated layer. However, it is recognized that other print head types and corresponding label types could be used. The adhesive side of the labels may be entirely or partially coated with adhesive. The labels may be formed of any suitable material. The various components of the scale 10 could be integrated into a single housing or unit. Alternatively, the scale 10 may be formed of components formed as separate units and connected together for communication with each other, in which case the controller may be a distributed controller, with various control functions distributed among the components. As used herein the terminology "controller" is intended to encompass the distributed controller configuration. Further, the term "controller" is intended to broadly encompass the collection of circuits, processors and other components that carry out the various operating and processing functions of the scale and its component parts.

To provide marketing incentives from the scale 10, the controller 26 also accesses an incentive database or database(s) (stored in suitable memory of the controller or accessible via link to another computer system such as a P.O.S. system or a regional or national computer system of a store chain) that identifies incentives linked to specific products based upon the PLU number or other product identifier. The incentive database(s) could be incorporated into the price database or could be a separate database. The incentive database identifies whether there is an incentive linked to the product that is weighed and for which a product label having price information is printed. If there is an incentive linked to the product, the incentive database also identifies the details of the incentive. By way of example, the incentive link could be the incentive (graphic and or data) itself, could be a number or numbers representing an incentive data memory location, could be a simple state bit used as a flag, or could simply be the inclusion of the specific product (i.e., the product being weighed) in the incentive database. Importantly, the incentive that is linked to any specific product will typically be for a different product. Usually the different product will be a product that is complementary to the weighed product as opposed to a product that is competitive with the weighed product. For example, for a given brand of deli ham that is weighed an incentive might be provided for a product such as a particular brand of mayonnaise, mustard or potato chips. As another example, when celery or carrots are weighed an incentive might be provided for a particular brand of vegetable dip, or when salad is weighed an incentive might be provided for a particular brand of salad dressing.

As used herein the term "weighed product" will be used to refer to the product that is weighed by the scale and that may have an incentive linked therewith and the term "incentive product" will be used to refer to a product to which an incentive relates. If an incentive is linked to a weighed product, the controller establishes incentive print data (such as incentive product name, nature of incentive, expiration date, scannable coupon bar code, logo or other graphics data and label set-up and format) to be delivered to the printing mechanism 30 to print a separate "incentive label" that contains the incentive. In this manner the product label can be applied to the weighed product and the separate incentive label can be placed directly in the hand of the consumer (either by store personnel or directly from the scale/label printer 10 to the consumer). This technique provides an advantage over point of sale coupon distribution in that a consumer receives the incentive before completing a shopping experience and exiting the store. Additionally, as compared to incentive distribution techniques that provide incentives by requiring a customer to scan a card or other identifying mechanism at an incentive distributor located within the store, use of the scale 10 in the context of the above-described embodiment has the added advantage of providing incentives without requiring the customer to do anything within the store that the customer would not normally do. Still further, another advantage is that there are many existing scale/label printers currently in use in stores, and such scales can be adapted to print incentive labels by an appropriate programming change, thus providing an incentive distribution technique that does not necessarily require stores to purchase and/or install additional hardware.

The incentive provided to the consumer will typically be in the form of a coupon. As used herein the term coupon is broadly used to encompass both cents off and percent off type offers, as well as 2 for the price of 1 type offers. The incentive label will typically be printed with the incentive visually stated thereon and with a coupon bar code that can be scanned at the point of sale to effect application of the incentive for a customer purchasing the incentive product, where the point of sale computer terminals access a coupon database and the coupon database links the details of any given incentive with the coupon bar code provided on the incentive label.

Figure 9:
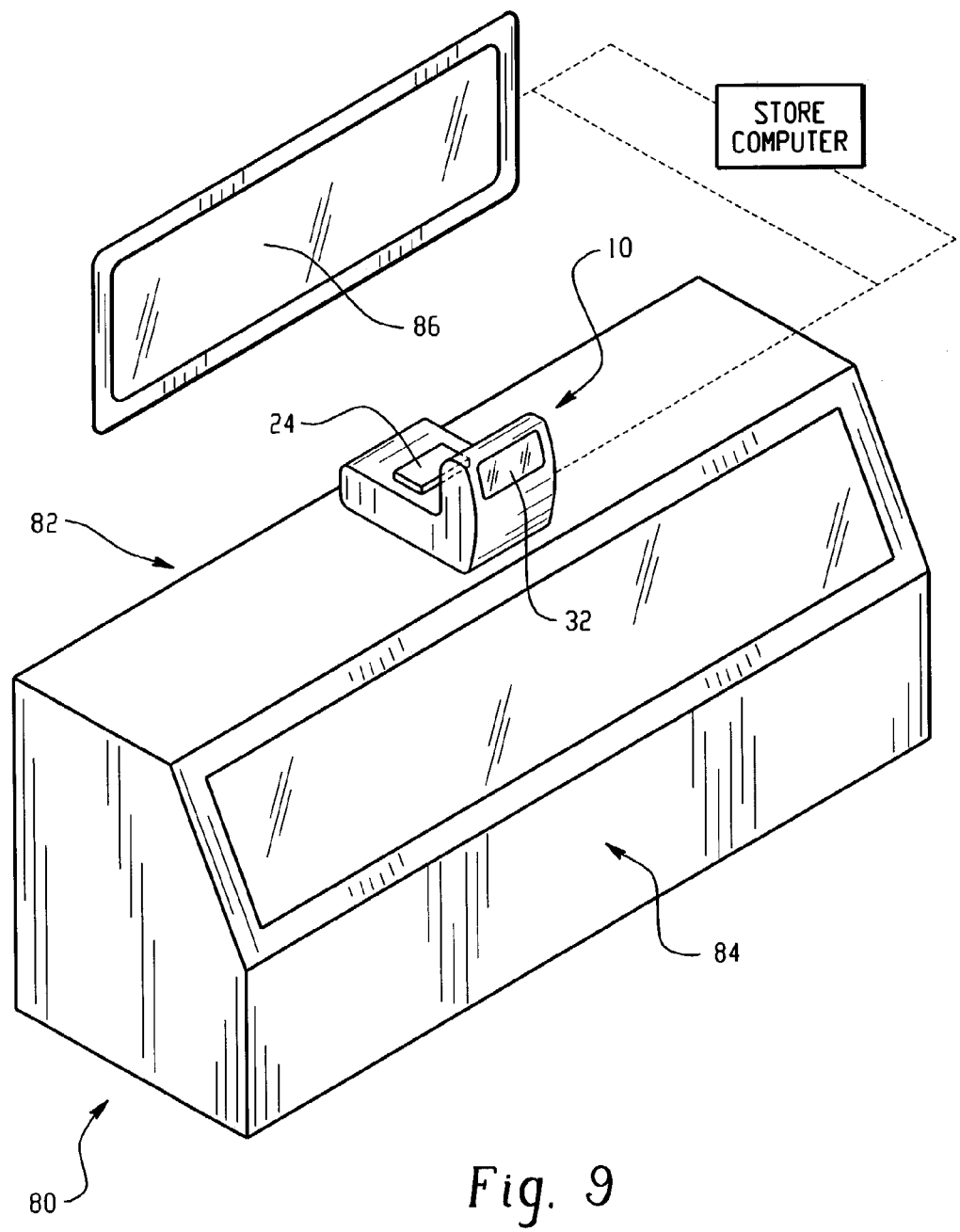
FIG. 9 is an exemplary environmental diagram in accordance with one or more embodiments of the present application.
Figure 10A:
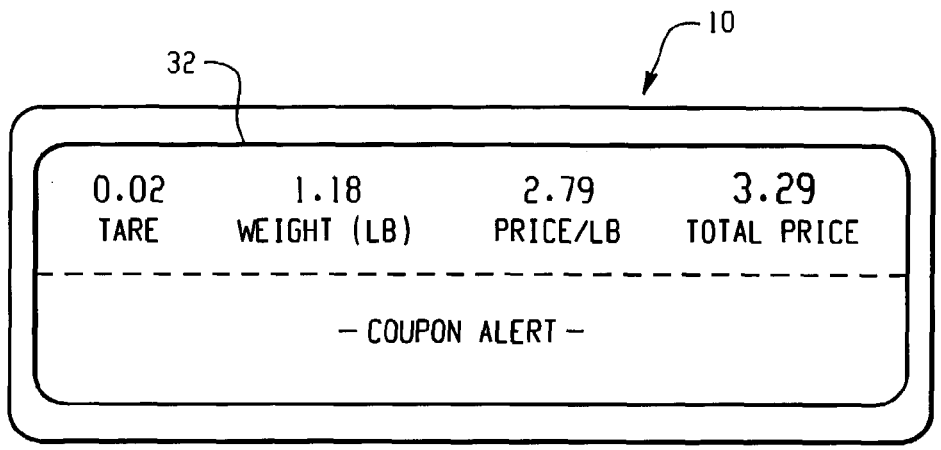
FIGS. 10A-C are exemplary displays for a scale in accordance with one or more embodiments of the present application.
Figure 10B:
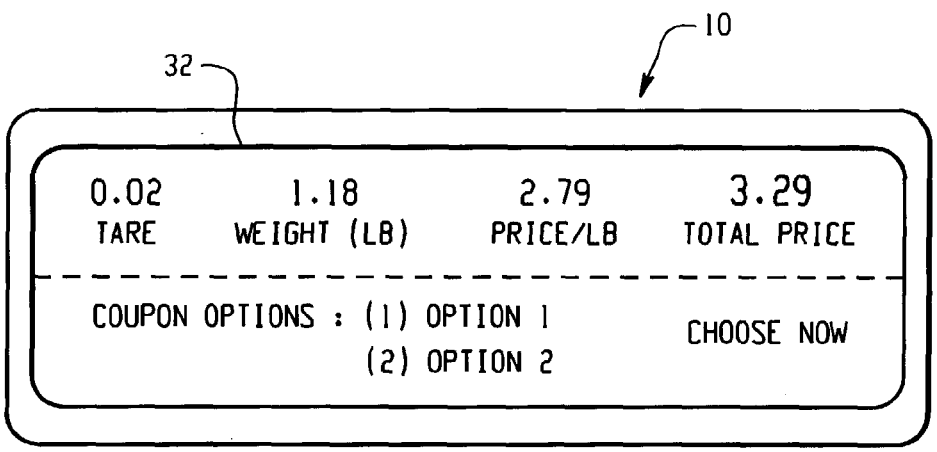
Figure 10C:
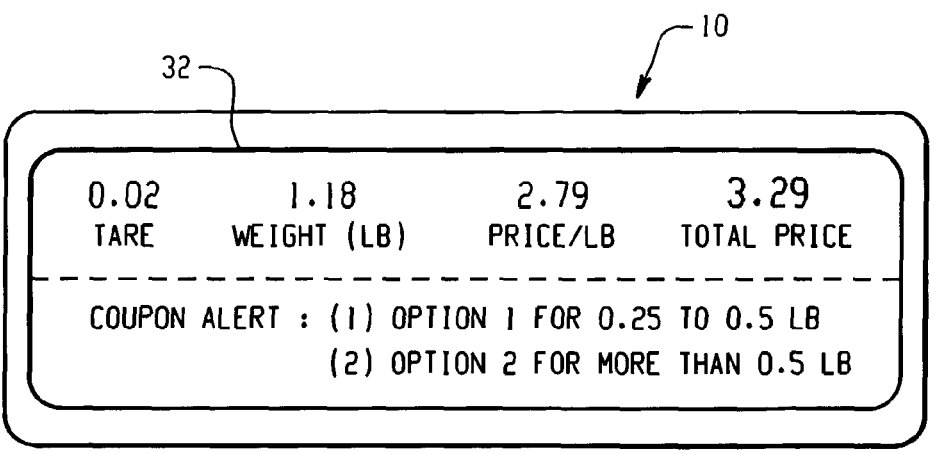

Another possible feature of incentive production by a scale 10 may include the controller 26 notifying the store personnel or customer that an incentive label will be printed by causing a display 32 to display a message advising of the same. Multiple displays 32 may be provided, including a primary operator display, a primary customer display and an auxiliary customer display per the embodiments illustrated in FIGS. 9-10. In FIG. 9, a scale 10 is positioned atop a typical deli display counter 80 with a display 32 facing the customer side 84 of the counter 80. The scale 10 would typically also include an operator display (not shown) facing the store personnel side of the counter 80. The display 32 can be used to display messages to the customer regarding coupon activity. Referring to FIG. 10A, a generic "Coupon Alert" is displayed to advise the customer that a coupon is being issued, enabling the customer to ask for the coupon if the store personnel for some reason fail to provide the coupon to the customer. FIG. 10B illustrates an example where multiple possible coupons or other incentives are linked to the product being weighed. The display 32 displays the incentive options so that one can be selected by the customer. In one embodiment, the customer could advise the store personnel as to the coupon desired, and the store personnel could utilize the input device of the scale to select the desired incentive for printing. In another embodiment, the customer could select the incentive directly using an input device. For example, the display screen 32 could be a touch screen display or the scale could include some other separate customer input device such as a keypad facing the customer. FIG. 10C illustrates an example where the incentive linked with the weighed product is a progressive incentive having discount levels that increase as a function of either the weight or value of the weighed product purchased. In particular, the Option 1 incentive, which applies when the weighed product is between 0.25 and 0.5 pounds, could be a 50 cent coupon while the Option 2 incentive, which applies when the weighed product is more than 0.5 pounds, could be a 75 cent coupon. This type of use of the display 32 in connection with the progressive incentive is designed to impact the customer in a manner causing the customer to purchase more of the weighed food product, with the scale printing the incentive label according to the weight of the weighed product.

It is recognized that other display devices could also be used to display the incentive information to customers. For example, the display 32 could be a primary customer display and an auxiliary, marquee type display could also be attached to the scale 10. Referring again to FIG. 9, another alternative provides a large display 86 that may be mounted on a wall behind the counter 80. The scale 10 could be connected to control the display 86 either directly or indirectly, such as through a store computer system. The large display 86 could also be used to regularly display all incentive options available that day, meaning that each product having a linked incentive would be identified and the corresponding incentive product or products as well as the incentive level or levels could be displayed, so as to influence a customer's shopping decision based upon the incentive that might be obtained.

A scale 10 could also include an audio capability, as provided by a small speaker or other sound emitting device (not shown), in which case a verbal message could be initiated advising the customer of the incentive.

Figure 11:
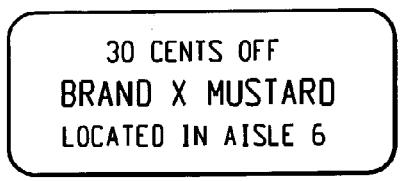
FIG. 11 is another exemplary label in accordance with one or more embodiments of the present application.

Another possible feature of incentive production by a scale 10 may include printing on the incentive label the location within the store where the incentive product is located, enabling the customer to easily find the product if desired. See for example the label shown in FIG. 11.

Still a further possible feature of incentive production by a scale 10 may include providing a product support and display unit proximate to the location where the scale is located so that after the incentive label is placed in the hand of a customer, one of the first things the customer sees when moving on is the exact product to which the incentive applies. For example, referring again to FIG. 2, assuming the scale 10 is located in the deli department 22, an end-cap type display unit 34 at the end of the deli-counter and/or an on-counter display unit 36 may hold one or more incentive products.

Where the incentive database is stored in memory of the controller 26 of the scale 10, it is contemplated that the database could be altered by receipt by appropriate downloads, or other type of interfacing, from other in-store computer systems 38, a chain's regional computer system 40 or a chain's national computer system 42. In this regard, the controller 26 of FIG. 1 could include appropriate communications interface 27 (see FIG. 15) capabilities as needed, such as hardwired interfaces or wireless interfaces. In one embodiment, the scale interface could utilize a web server, but it is recognized that other interface types and protocols could be used. Referring again to FIG. 1, a separate entity's computer system 44 (not the store or store chain) might also control the incentive database.

Figure 14:
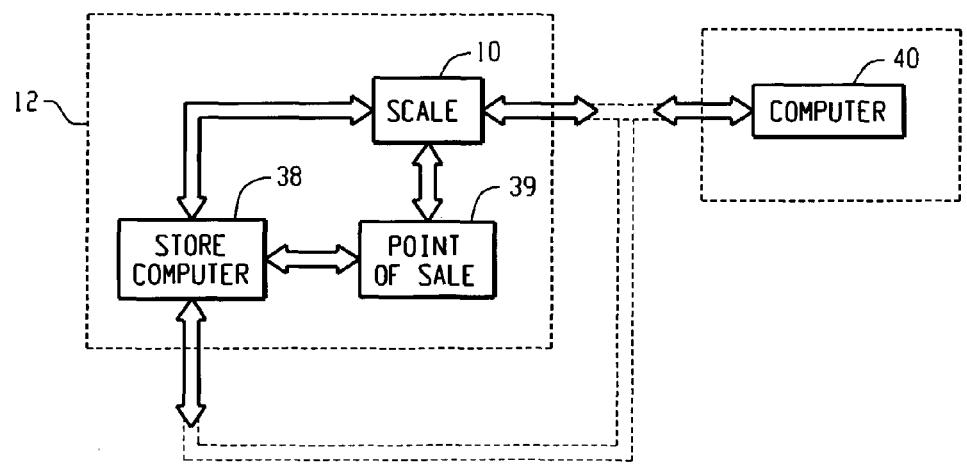
FIG. 14 is schematic diagram of a system in accordance with one or more embodiments of the present application.
Figure 15:
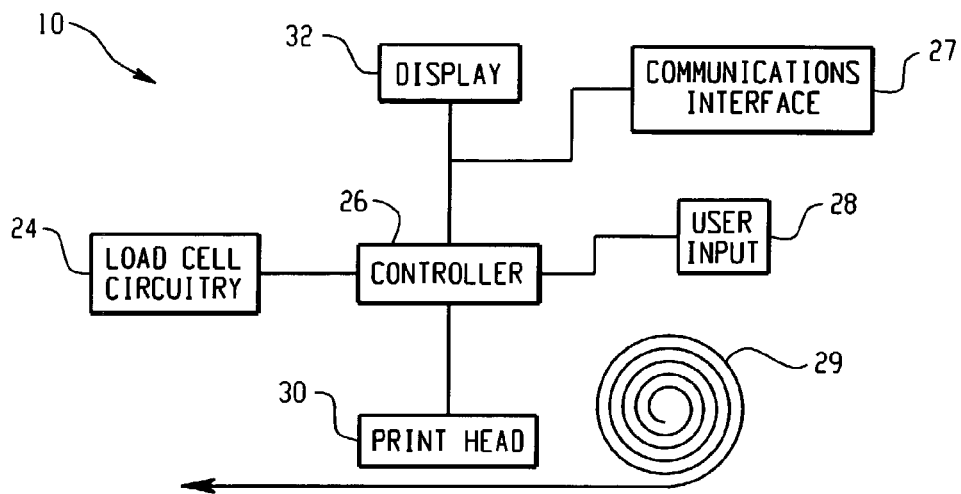
FIG. 15 is a schematic representation of a scale in accordance with one or more embodiments of the present application.
Figure 16:
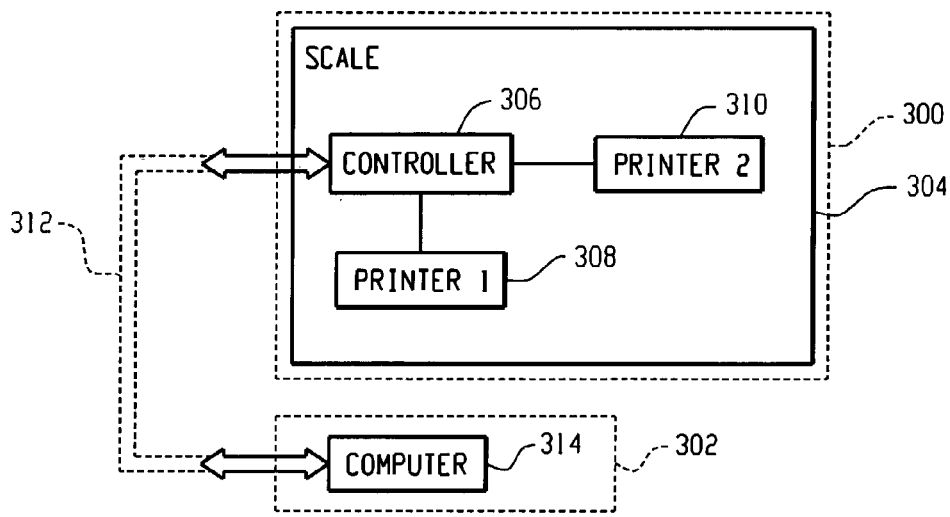
FIG. 16 illustrates a prior art system.

FIG. 14 illustrates an embodiment in which a scale 10 is located in a store 12 and is connected for communication with a store computer system 38, a point-of-sale computer system 39 and a regional computer system 40 of the store chain. FIG. 15 is a schematic representation of the scale 10 including communications interface 27 of the controller 26, and an associated supply of labels in the form of a label roll 29. In the case of liner-type labels, the roll 29 includes a backing with a release coating and multiple adhesive labels positioned thereon.

The controller 26 of the scale 10 may also include tracking software for maintaining a running count of number of incentives provided for each incentive product to facilitate the task of charges that may apply on a per incentive basis, or for use in identifying the redemption rate of incentives. The tracked incentive data may be accessed remotely (such as by one or more computer systems 38, 40, 42, 44 of FIG. 1) or the controller 26 may be programmed to automatically send this information to an appropriate computer system. Incentive label tracking may be performed on a per incentive product basis, on a per manufacturer basis where the manufacturer has more than one incentive product for which incentive labels are generated, or on any other suitable basis or combinations of the same.

One alternative embodiment of a scale 100 is shown in FIG. 3 where two printer mechanisms 130A and 130B are provided, each having its own supply of labels and its own print head. In this configuration the product label is printed by one printer mechanism 130A and the incentive label is printed by the other printer mechanism 130B. In this technique different label sizes and/or configurations could be used as between the product labels and the incentive labels. Both printer mechanisms 130A and 130B could be integrated within the scale 100 or, alternatively, one or both of the printer mechanisms could be an add on device.

Referring to FIG. 4, an embodiment of an exemplary label construction 200 that can be used in connection with printing incentive labels is shown. The label 200 includes a fold line 202 along its midpoint. The fold line could be a series of perforations or could be a score line in the label. The fold line advantageously enables store personnel (or the customer) to fold the label upon itself as shown in FIG. 5 so that the adhesive side of the label is substantially covered to facilitate manual handling of the incentive label. The folded incentive label 200 includes the non-tacky paper or plastic portion 204 arranged to the outer side and the tacky adhesive layer 206 arranged to the inner side of the resulting label construction. Such a label can be described as having two parts or segments 210A and 210B, and it is contemplated that different incentive information could be printed on the two segments. Alternatively, incentive information could be printed on one segment and other information could be printed on the other segment.

Another possible label construction 220 is shown in FIG. 6 where the label is provided with two fold lines 222 and 224, creating three label parts or segments 226A, 226B and 226C. The two label segments 226A and 226B are folded under as reflected in FIG. 7, again to place the adhesive layer to the inner side of the resulting label construction.

It is also recognized that the incentive label need not be folded upon itself. For example, particularly in the case of embodiments having two printer mechanisms, the supply of incentive labels associated with the incentive printer mechanism could be labels that have only a slight tackiness that is sufficient to allow the incentive labels to be applied to a weighed product while still permitting a customer to easily remove the incentive label from the product. As another alternative, the second printer mechanism that is used to print incentive information could include a supply of non-label media, such as paper or plastic media having no tackiness at all. As used herein the term "incentive ticket" is used to encompass both labels having incentive information printed thereon and non-label media having incentive information printed thereon. Incentive information could be provided to customers in other formats as well.

An embodiment of a back room type scale system 400 is shown in FIG. 8. A weigh/wrap machine 402 includes an infeed 404 for receiving packages. A conveyor transports the package to a wrap station 406 where the package is typically lifted vertically into film for wrapping. The wrapped package is then conveyed to an outfeed location 408 and moved toward a label printer mechanism 410 where a product label is applied. In this regard, a weighing station 412 may be provided at the infeed 404 for weighing each package. The printer mechanism could be used to apply both a product label and an incentive label, with a controller of machine 402 operable to access an incentive database (within memory of the machine 402 or accessed remotely) to determine if the weighed product includes an incentive linked thereto and, if so, to produce the incentive print data for the printer mechanism 410 to print an incentive label that could also be automatically applied to the product. Alternatively, an additional printer mechanism 414 may be positioned alongside the weigh/wrap machine, and connected for communication therewith, for printing and applying incentive labels to the wrapped package when incentive links exist in the incentive database. In this regard, the controller of machine 402 could access an incentive database or a controller of printer mechanism 414 could access an incentive database. The multiple printer mechanism arrangement could allow for the second printer mechanism 414 to include a supply of labels with a relatively low adhesion so that a customer could remove the incentive label from a package and hand the incentive label to the check out personnel as a coupon.

In another embodiment a scale having a single printing mechanism could include a supply of labels with alternating label types, one for use in printing product labels and the other for use in printing incentive labels. Such a label supply might most often be used for back room systems of the type described above where the same product is often wrapped and labeled in large quantities. For example, referring to FIG. 8 the printing mechanism 410 could include a supply of two different types of labels that alternate between two types, where the two types have different configurations and/or different adhesive properties.

Figures 12A, 12B:
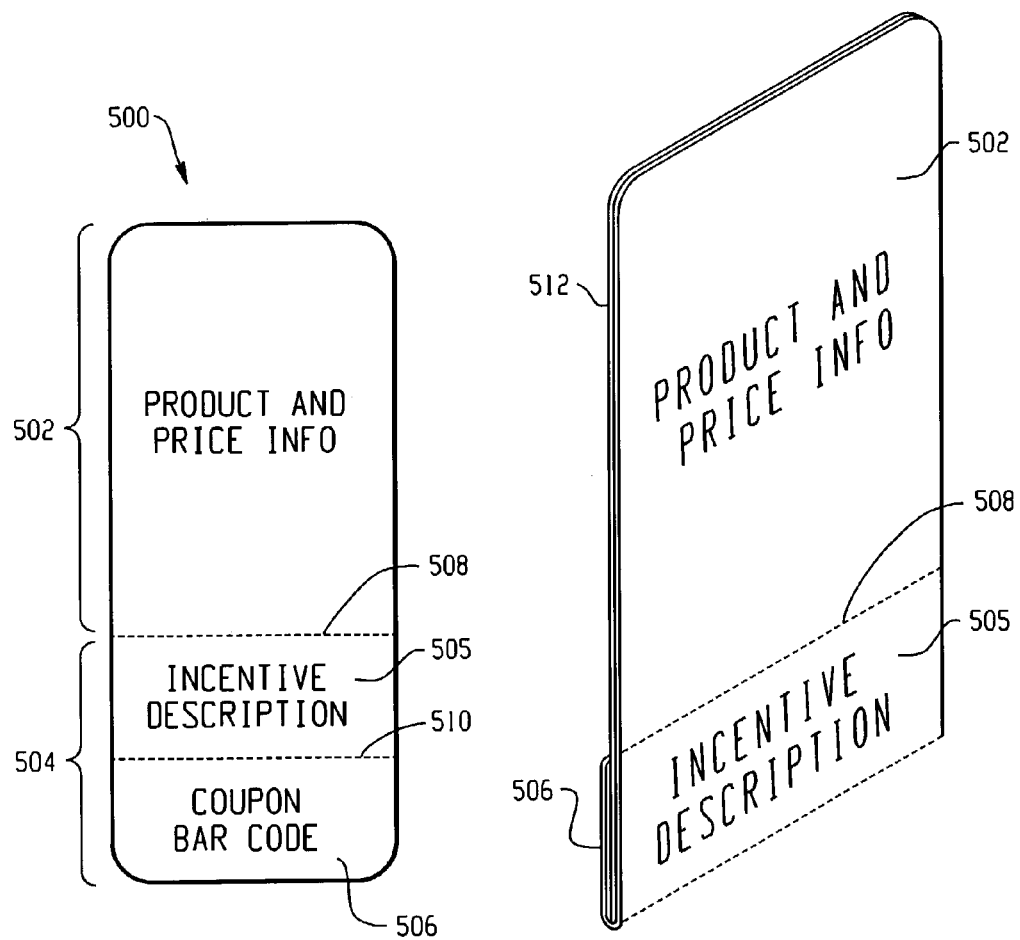
FIGS. 12A-B are additional exemplary labels in accordance with one or more embodiments of the present application.
Figure 13:
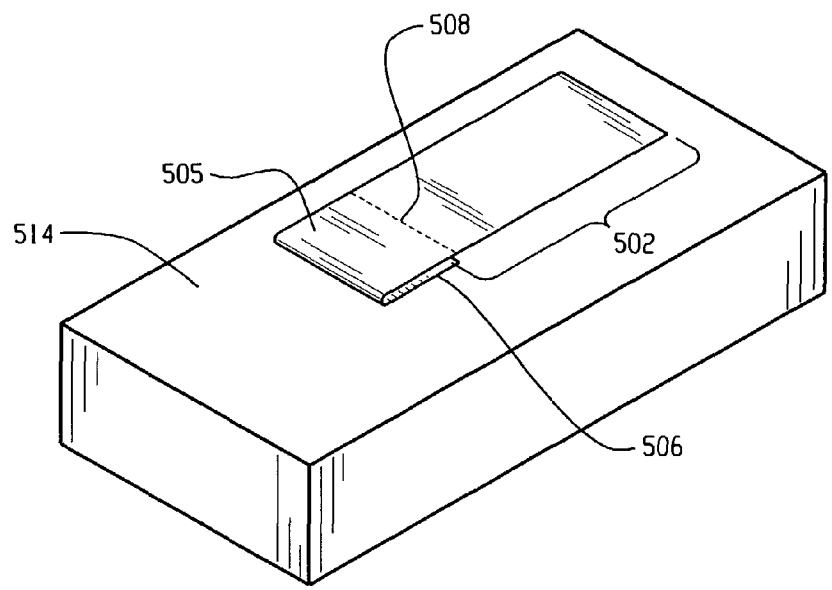
FIG. 13 is a package having an exemplary label applied thereto in accordance with one or more embodiments of the present application.

Another embodiment of a label and resulting package assembly useful in connection with the incentive features described herein is shown in FIGS. 12 and 13. FIG. 12A shows an upper, printing surface of a label 500 having parts or regions 502 and 504. A separation line 508, which by way of example may be a series of perforations or a score line in the label, divides part 502 from part 504. A fold line 510 divides part 504 into sub-parts 505 and 506. It is contemplated that an entirety of the rear surface of the label would include an adhesive layer, although less than the entirety of the surface could be adhesive. The label 500 can be used in connection with scale label incentives as follows. When a product is weighed and the price of the product calculated, the printing mechanism prints price and product information, which may include a pricing bar code, on part 502. If the weighed product includes an incentive link, the printing mechanism prints incentive information on one or both of sub-parts 505 and 506. In one example, indicia identifying the nature of the incentive to the customer is printed on sub-part 505, and a coupon bar code is printed on sub-part 506. The label sub-part 506 is then folded under the label sub-part 505 to produce a folded label as shown in the perspective of FIG. 12B where the adhesive layer 512 is illustrated for ease of understanding. The folded label can then be applied to a package 514 per FIG. 13 to produce a labeled package assembly. In the illustrated embodiment label sub-parts 505 and 506 are of similar size. When sub-part 506 is folded under and against sub-part 505 it becomes adhesively attached thereto with the coupon bar code facing the opposite direction of the incentive description. When the folded label is applied to package 514, only label part 502 is adhesively held to the package because the adhesive on sub-parts 505 and/or 506 is no longer exposed. This construction enables the incentive portion of the label 500, comprised of sub-parts 505 and 506, to be removed from the package for use by a customer by separation along line 508. Alternatively, if the customer chooses not to use the incentive, the coupon bar code is left adjacent to and facing the package so that it will not interfere with any scanning operation at the checkout location of the store.

While much of the foregoing description contemplates the printing of an incentive label that is separate from the product label, it is apparent from the example provided in FIGS. 12 and 13 that certain features described here could be used in conjunction with an incentive label that is integrated with the product label. Unless otherwise specifically stated in any claim of this application, language describing the printing of an incentive label and the printing of a product label should be interpreted to cover both printing of separate labels and printing of an integrated label.

While the foregoing description has focused primarily upon the use of an incentive database with links between products to print incentive labels, it is recognized that other types of incentive links could be used. For example, an incentive database could include a location link to produce incentive labels. In particular, referring to FIG. 2, the fish and vegetable department 16 of a store may include an associated product display unit 37 in proximity thereto and holding and displaying a first incentive product, the meat and fish department 18 may include an associated product display unit 39 holding and displaying a second incentive product and the deli department 22 may include product display unit 34 and/or 36 holding and displaying a third incentive product. The incentive database, which could be the same for scales located in each of departments 16, 18 and 22 could include incentive links based upon the location of the scale (for example, by department) and would incorporate incentive links for products based upon the known incentive product being displayed in proximity to the department in which the scale is located. Each scale could be programmed with an identifying number or a location specific number that is used to access the incentive database. In this way, scales in the fruit and vegetable department 16 could produce incentive labels for products displayed at unit 37 with or without regard to the product being weighed, scales in the meat and fish department 18 could produce incentive labels for products displayed at unit 39 with or without regard to the product being weighed and scales in the deli department 22 could produce incentives for products displayed at units 34 and/or 36 with or without regard to the product being weighed. In the case where the incentive labels are produced without regard to the product weighed, the incentive link could be referred to as a location specific incentive link as opposed to a product specific incentive link.

Although the invention has been described and illustrated in detail it is to be clearly understood that the same is intended by way of illustration and example only and is not intended to be taken by way of limitation. For example, some items include standard weights, such as bakery items in the bakery perishable department, and those items need not be weighed when producing product labels and incentive labels. In such cases the PLU is usually set up to indicate that the item has a standard weight or price and the price for the product label or price is set based upon the standard weight or price. The use of an incentive database in such cases could be the same as any of the foregoing descriptions. Another situation where weighing of an item would not be needed might be in the case of an item that is priced by quantity (number of items) rather than weight (such as apples priced at 3 for $1.00). Because weighing is not a requirement in such instances, the label printer used to print the incentive label need not be associated with a scale.

It is recognized that numerous variations exist, including both narrowing and broadening variations of the appended claims.

What is claimed is:

1. In a store including at least one point of sale checkout terminal and at least one perishable food department having a label printer installed therein for printing product labels for items, a method of providing an incentive label to a customer prior to checkout comprising the steps of:
   providing to the label printer an identifier of a first item;
   based upon at least the identifier for the first item, establishing a price for the first item;
   accessing an incentive database based upon the first item identifier to determine if an incentive link exists for the first item;
   if an incentive link exists for the first item, the label printer printing an incentive label containing an incentive for a second item that is different than the first item,
   wherein the incentive label includes at least one fold line therein to divide the label into at least first and second parts, in the printing step a coupon bar code is printed on a label print side of the first part and incentive identification indicia is printed on a label print side of the second part;
   prior to providing the incentive label to the customer, the incentive label is folded along the fold line such that the first part is located beneath the second part and is adhesively held thereto.

2. The method of claim 1 wherein the incentive label includes a separation line spaced from the fold line to define a third part of the label, the incentive label is applied to a package with the label print side of the second part and the third part facing outward from the package and with the label print side of the first part facing inward toward the package, where the third part is adhesively held to the package so as to be non-removable and the first and second parts are removable by tearing the incentive label along the separation line.

3. The method of claim 2 wherein the printing step further involves printing the calculated price of the first item on the label print side of the third part of the label.

4. The method of claim 1 involving the further step of printing the established price of the first item on a product label that is distinct from the incentive label.

5. The method of claim 2 wherein the incentive label includes a separation line spaced from the fold line to define a third part of the label, the incentive label is applied to a package with the label print side of the second part and the third part facing outward from the package and with the label print side of the first part facing inward toward the package to prevent accidental scanning of the coupon bar code at a point of sale terminal during checkout.

6. The method of claim 1 comprising the further step of separating the first part and the second part from the third part via the separation line in order to enable scanning of the coupon bar code at a point of sale terminal.

7. The method of claim 1 wherein the label printer comprises a scale including a weighing station for weighing the first item, the price for the first item is based in part upon its weight, the scale includes a housing, and a print head is located within the housing.

8. The method of claim 7 wherein the label includes a separation line spaced from the fold line to define a third part of the label, and the method includes printing the calculated price on the label print side of the third part of the label.

9. In a store including at least one point of sale checkout terminal and at least one perishable food department having a scale system installed therein, the scale system including a printer, a method of providing a coupon to a customer comprising the steps of:
   providing a supply of labels in connection with the printer of the scale system, each label including (i) a front side and a rear side, (ii) a first portion for having price information printed thereon, the second side of the first portion is adhesive, (ii) a second portion for use as a coupon, at least one separation line between the first portion and the second portion, at least part of the rear side of the second portion is adhesive, the second portion includes a first sub-part and a second sub-part with a fold line therebetween;
   weighing a food product and establishing a price for the weighed food product based at least in part upon its weight;
   outputting a given label of the supply of labels from the scale, the price printed on the front side of the first portion of the given label, the second portion of the given label is a coupon for a given product that is different than the weighed food product, the first sub-part of the second portion of the given label includes an incentive indicator at its front side, the second sub-part of the second portion of the given label includes a coupon bar code at its front side;

folding the second portion of the given label along the fold line such that the first sub-part is located beneath the second sub-part and is adhesively held thereto;

applying the given label to a package containing the weighed food product such that (i) the given label is adhered to the package by adhesive at the rear side of the first portion of the given label, (ii) the coupon bar code of the second portion of the given label faces against the package and (iii) the second portion of the given label is removable from the package by detaching the second portion from the first portion along the separation line; and providing the labeled package to a customer.

10. The method of claim 9 wherein each of (i) the price, (ii) the incentive indicator and (iii) the coupon bar code is printed on the given label by the printer of the scale system.

11. The method of claim 10 wherein the scale system includes an associated customer display, the method further involves:

determining if multiple incentives are associated with the weighed food product and, if so, displaying both a first incentive indication and a second incentive indication on the customer display; and responsive to an input identifying a selected incentive from among those displayed, the incentive indicator and the coupon bar code are printed for the selected incentive, which relates to the given product.

12. The method of claim 11 wherein the scale system includes an associated customer input device at which the input identifying the selected incentive is made by a customer.

13. The method of claim 11 wherein the scale system includes an associated operator input device at which the input identifying the selected incentive is made by an operator.

14. The method of claim 10 wherein the scale system includes an associated customer display, the method further involves:

determining if a progressive incentive is associated with the weighed food product and, if so, displaying progressive incentive information on the customer display for inviting a customer to purchase more of the weighed food product in order to obtain a more economically advantageous incentive for the given product.

15. The method of claim 14 wherein the progressive incentive comprises a weight progressive incentive including multiple weight levels and corresponding incentive levels, the progressive incentive information displayed includes each weight level and its corresponding incentive level.

16. The method of claim 9 wherein a product display unit is positioned proximate to the scale system in the store and holds and displays the given product.

17. The method of claim 9 wherein the first-sub-part and second sub-part of the second portion of the given label have substantially the same size and configuration.

18. The method of claim 9 wherein the first portion of the given label is larger than the second portion of the given label.

19. The method of claim 9 wherein the separation line and the fold line of the given label are parallel.

20. The method of claim 19 wherein the separation line and the fold line of the given label extend perpendicular to a lengthwise axis of the given label.

21. The method of claim 9 wherein the scale system comprises a scale with a housing, the printer integrated within the housing.

22. In a store including at least one point of sale checkout terminal and at least one perishable food department having a scale system installed therein, the scale system including a printer, a method of providing a coupon to a customer comprising the steps of:

providing a supply of labels in connection with the printer of the scale system, each label including (i) a front side and a rear side, (ii) a first portion for having price information printed thereon, the second side of the first portion is adhesive, (ii) a second portion for use as a coupon, at least one separation line between the first portion and the second portion, at least part of the rear side of the second portion is adhesive, the second portion includes a first sub-part and a second sub-part with a fold line therebetween;

providing to the scale system an identifier of a first food product;

accessing a database based upon the identifier and retrieving a price per unit weight associated with the identifier;

weighing the first food product;

based upon at least the price per unit weight and weight of the first food product, establishing a price for the first food product;

accessing a database to determine if an incentive link exists for the first food product;

if an incentive link exists for the first food product, printing on a given label of the supply of labels (i) incentive information on the front side of the second sub-part of the second portion of the given label and (ii) a coupon bar code on the front side of the first sub-part of the second portion of the given label;

folding the second portion of the given label along the fold line such that the first sub-part is located beneath the second sub-part and is adhesively held thereto;

applying the given label to a package containing the first food product such that (i) the given label is adhered to the package by adhesive at the rear side of the first portion of the given label, (ii) the coupon bar code of the second portion of the given label faces against the package and (iii) the second portion of the given label is removable from the package by detaching the second portion from the first portion along the separation line; and providing the labeled package to a customer.

23. A labeled package assembly, comprising:

a package containing a first product;

a label attached to the package, the label including at least one separation line dividing the label into first and second parts, the second part including a fold line dividing the second part into first and second sub-parts, and the first sub-part folded under the second-subpart and adhesively attached thereto, the first sub-part including a scannable coupon bar code thereon that relates to a second product that is different than the first product, the scannable coupon bar code facing inwardly toward the package, the second sub-part adjacent the separation line and including indicia specifying incentive information for the second product, the first part including information related to the first product, the first part adhesively attaching the label to the package such that the first part is fixed to the package while enabling the second part to be removed from the package by detachment along the separation line.

24. The labeled package assembly of claim 23 wherein the first and second sub-parts are substantially the same size and configuration.

25. The labeled package assembly of claim 23 wherein the first part of the label is longer than the second part of the label, the first part and second part have substantially the same width, the at least one separation line comprises a single separation line.

26. The labeled package assembly of claim 24 wherein the separation line and the fold line are parallel.

27. The labeled package assembly of claim 24 wherein the separation line and the fold line of the label extend perpendicular to a lengthwise axis of the label.

28. The labeled package assembly of claim 23 wherein the first product is a perishable food product, the second product is also a food product.

* * * * *

UNITED STATES PATENT AND TRADEMARK OFFICE
CERTIFICATE OF CORRECTION

| | | |
|---|---|---|
| PATENT NO. | : 8,249,928 B2 | Page 1 of 1 |
| APPLICATION NO. | : 10/423471 | |
| DATED | : August 21, 2012 | |
| INVENTOR(S) | : Robert J. Schuller et al. | |

It is certified that error appears in the above-identified patent and that said Letters Patent is hereby corrected as shown below:

Column 15, Line 4, Claim 25:

After "package assembly of claim" delete "23" and insert -- 24 --.

Signed and Sealed this
Thirteenth Day of November, 2012

David J. Kappos
*Director of the United States Patent and Trademark Office*